(12) United States Patent
Park et al.

(10) Patent No.: US 10,822,255 B2
(45) Date of Patent: Nov. 3, 2020

(54) WATER TREATMENT APPARATUS USING UNDERWATER PLASMA DISCHARGE AND WATER TREATMENT SYSTEM INCLUDING SAME

(71) Applicant: Doosan Heavy Industries & Construction Co., LTD., Changwon-si, Gyeongsangnam-do (KR)

(72) Inventors: Yong Hae Park, Changwon-si (KR); Yeong Hyeok Kim, Seoul (KR); Sung Won Park, Yongin-si (KR); Sung Woo Woo, Seongnam-si (KR); Seung Won Ihm, Goyang-si (KR)

(73) Assignee: Doosan Heavy Industries & Construction Co., LD, Changwon-si (KR)

( * ) Notice: Subject to any disclaimer, the term of this patent is extended or adjusted under 35 U.S.C. 154(b) by 289 days.

(21) Appl. No.: 16/030,790

(22) Filed: Jul. 9, 2018

(65) Prior Publication Data

US 2019/0016612 A1    Jan. 17, 2019

(30) Foreign Application Priority Data

Jul. 14, 2017   (KR) ........................ 10-2017-0089579
Dec. 1, 2017    (KR) ........................ 10-2017-0164064
Jan. 3, 2018    (KR) ........................ 10-2018-0000689

(51) Int. Cl.
*C02F 1/46*     (2006.01)
*C02F 1/463*    (2006.01)
(Continued)

(52) U.S. Cl.
CPC .............. *C02F 1/4608* (2013.01); *C02F 1/24* (2013.01); *C02F 1/441* (2013.01); *C02F 1/444* (2013.01);
(Continued)

(58) Field of Classification Search
None
See application file for complete search history.

(56) References Cited

U.S. PATENT DOCUMENTS 6,228,266 B1 *    5/2001   Shim ..................... C02F 1/4608
                                                    205/753
2005/0189278 A1 * 9/2005   Iijima .................... B01J 19/088
                                                    210/192

(Continued)

FOREIGN PATENT DOCUMENTS

EP       2645195 A      10/2013
EP       18162266.3      7/2018
(Continued)

*Primary Examiner* — Kishor Mayekar
(74) *Attorney, Agent, or Firm* — Foundation Law Group LLP; Kwang Jun Kim; J D Harriman

(57) ABSTRACT

Disclosed are a water treatment apparatus using underwater plasma discharge and a water treatment system using the same. The apparatus includes a reactor having an inlet through which raw water flows in and an outlet through which purified water flows out, a ground electrode provided at a first side of the reactor, and a plasma electrode module provided at a second side of the reactor and configured to generate plasma. With plasma generated through underwater discharge, it is possible to decompose or remove organic substances and microorganisms present in raw water.

18 Claims, 8 Drawing Sheets

(51) Int. Cl.
    *C02F 103/08*    (2006.01)
    *C02F 1/44*    (2006.01)
    *C02F 1/24*    (2006.01)

(52) U.S. Cl.
    CPC .......... *C02F 1/463* (2013.01); *C02F 2103/08* (2013.01); *C02F 2201/4611* (2013.01); *C02F 2301/024* (2013.01); *C02F 2303/04* (2013.01)

(56) References Cited

U.S. PATENT DOCUMENTS

| | | | |
|---|---|---|---|
| 2010/0219136 A1* | 9/2010 | Campbell | C02F 1/4608 210/748.01 |
| 2015/0139853 A1* | 5/2015 | Zolezzi-Garreton | C02F 1/4608 422/22 |
| 2016/0228844 A1* | 8/2016 | Mededovic | B01J 19/088 |

FOREIGN PATENT DOCUMENTS

| | | |
|---|---|---|
| JP | 2006051441 A | 2/2006 |
| JP | D6 5295485 B | 8/2007 |
| JP | D8 2009-097500 A | 5/2009 |
| JP | 2013-117752 A | 6/2013 |
| JP | D7 2014-113517 A | 6/2014 |
| JP | 2013-117752 A | 6/2016 |
| KR | 10-2005-0041926 A | 5/2005 |
| KR | D3 10-0901922 B | 6/2009 |
| KR | D5 2009-97340 A | 9/2009 |
| KR | 10-2009-011060 A | 10/2009 |
| KR | D4 10-1119529 B | 12/2011 |
| KR | D1 10-1266157 A | 12/2012 |
| KR | D2 10-1660712 A | 6/2015 |
| KR | 10-1579349 B | 12/2015 |
| KR | 10-2016-0062685 A | 6/2016 |
| KR | 10-2017-022839 A | 3/2017 |
| WO | 02/03150 A | 1/2002 |

\* cited by examiner

WATER TREATMENT APPARATUS USING UNDERWATER PLASMA DISCHARGE AND WATER TREATMENT SYSTEM INCLUDING SAME

CROSS REFERENCE TO RELATED APPLICATION

The present application claims priority to Korean Patent Application No. 10-2017-0089579 (filed on Jul. 14, 2017), Korean Patent Application No. 10-2017-0164064 (filed Dec. 1, 2017), and Korean Patent Application No. 10-2018-0000689 (filed on Jan. 3, 0018), the entire contents of which are incorporated herein for all purposes by this reference.

BACKGROUND OF THE DISCLOSURE

1. Field of the Disclosure

The disclosure relates to a water treatment apparatus using underwater plasma discharge and a water treatment system including the same. More particularly, the present disclosure relates to a water treatment apparatus capable of decomposing or removing organic substances or microorganisms present in water to be treated by using a plasma electrode or a plasma electrode module in which the plasma electrode is included, and to a water treatment system including the water treatment apparatus.

2. Description of the Background Art

A sedimentation-based water treatment method has been widely used so far. Sedimentation is a water treatment process of removing pollutants from water in a manner of letting the pollutants to gradually settle to the bottom of a settling basin by gravity and then performing solid-liquid separation by removing the pollutants deposited on the bottom of the settling basin. However, such a sedimentation process has drawbacks in that it is time-consuming and requires a large footprint. In addition, a more serious problem with the sedimentation process is the decay of sediments, which causes odor.

For this reason, various water treatment apparatuses for purifying wastewater with a small footprint have been developed. Among them, there is a pressure flotation method which is currently actively used in industries. This method removes pollutants in water by generating air bubbles which adhere to the pollutants, thereby causing the pollutants to float to the surface of the water where the pollutants are removed.

There are many types of pressure flotation. Among them, dissolved air flotation (DAF) is most widely used for wastewater treatment. The DAF is a process of purifying wastewater by the removal of suspended matter such as oil or solids. The removal is achieved by dissolving air to be saturated under pressure (i.e., at a pressure over atmospheric pressure) and then injecting the air-saturated wastewater into a flotation basin using a nozzle or a needle valve, which results in releasing the air at atmospheric pressure, thereby forming tiny bubbles having a size of 100 μm or smaller. These bubbles adhere to the suspended matter, thereby causing the suspended matter to float to the surface of the water where it may then be removed.

However, such a conventional dissolved air flotation method has a disadvantage of a small treatment capacity. Therefore, it has been usually used in only small scale water treatment plants. Furthermore, since the size of bubbles is determined by the structure of nozzles, it was impossible to adaptively adjust the size of bubbles after a dissolved air flotation facility was set up.

In addition, a pressure vessel for generating air-saturated water at a high pressure over atmospheric pressure requires a large amount of electric energy. Therefore, the cost of energy accounts for a large portion of the total operation cost. In addition, it frequently occurs that organic matter, such as algae, has difficulty in adhering to bubble-floc agglomerates but remains suspended in water. Therefore, it was difficult to remove this type of organic matter using sedimentation or flotation. In order to solve this problem, some improved methods, such as the addition of chlorine, have been proposed. However, the addition of chlorine has caused new problems, such as corrosion of parts, which results from over-dosage injection of chlorine.

Therefore, development of a water treatment apparatus capable of effectively removing organic substances and microorganisms present in raw water while eliminating the above disadvantages is required.

SUMMARY OF THE DISCLOSURE

Accordingly, the present disclosure has been made in view of the problems occurring in the related art, and thus an objective of the present disclosure is to provide a water treatment apparatus capable of decomposing or removing organic substances or microorganisms present in raw water by using a plasma electrode module, and a water treatment system including the apparatus.

The above and other objectives, features, and advantages of the present disclosure will be more clearly understood from the following detailed description regarding certain embodiments.

In order to accomplish the above objectives, one aspect of the present disclosure provides a water treatment apparatus using underwater plasma discharge, the apparatus including: a reactor having an inlet through which raw water flows into the reactor and an outlet through which purified water flows out; a ground electrode provided at a first side of the reactor; and a plasma electrode module provided at a second side of the reactor and configured to generate plasma.

In an embodiment, the reactor may further include a distance adjuster capable of adjusting a distance between the ground electrode and the plasma electrode module, and in an embodiment, the ground electrode may have a plate shape.

In the reactor, the ground electrode and the plasma electrode module may be arranged to face each other, and the inlet and the outlet may be provided on the same side. Alternatively, the inlet, the outlet, and the ground electrode may be provided on the same side.

The plasma electrode module may include: a tungsten base having a plurality of holes formed therein; a ceramic layer surrounding an outer circumferential surface of the tungsten base except for the holes; and a plasma electrode disposed inside the holes and having a multi-layered structure in which a ground portion having a cylinder shape, a fixed portion, and a discharge portion are sequentially stacked. The ground portion may be in contact with the tungsten base, and plasma may be generated around the discharge portion.

In an embodiment, the ground portion, the fixed portion, and the discharge portion may be made of the same material that may be a corrosion resistive material and may be provided as an integrated structure. In an embodiment, the integrated structure may be made of stainless steel (SUS) having a high corrosion resistance.

In an embodiment, a ratio of diameters of the ground portion, the fixed portion, and the discharge portion may be set to 7 to 8:4 to 6:1. In an embodiment, a ratio of heights of the ground portion, the fixed portion, and the discharge portion may be set to 1 to 2:1:1, and the tungsten base may have a plate shape or a cylinder shape.

Another aspect of the present disclosure provides a water treatment system using underwater plastic discharge, the system including a raw water supply unit for supplying raw water and a plurality of water treatment apparatuses connected in series or in parallel, each of the apparatuses including: a reactor having an inlet through which raw water flows into the reactor and an outlet through which purified water flows out; a ground electrode provided at a first side of the reactor; and a plasma electrode module provided at a second side of the reactor and configured to generate plasma.

The reactor may further include a distance adjuster capable of adjusting a distance between the ground electrode and the plasma electrode module, wherein the ground electrode may have a plate shape, and the ground electrode and the plasma electrode module may be arranged to face each other.

The plasma electrode module may include: a tungsten base having a plurality of holes formed therein; a ceramic layer surrounding an outer circumferential surface of the tungsten base except for the holes; and a plasma electrode disposed inside the holes and having a layered structure in which a ground portion, a fixed portion, and a discharge portion that all have a cylinder shape are sequentially stacked. The ground portion may be in contact with the tungsten base, and plasma may be generated around the discharge portion.

In an embodiment, the ground portion, the fixed portion, and the discharge portion may be provided as an integrated structure and may be made of the same material that is a corrosion resistive material. In an embodiment, the integrated structure may be made of stainless steel (SUS) having a high corrosion resistance.

More specifically, a ratio of diameters of the ground portion, the fixed portion, and the discharge portion may be set to 7 to 8:4 to 6:1. In an embodiment, a ratio of heights of the ground portion, the fixed portion, and the discharge portion may be set to 1 to 2:1:1.

The tungsten base included in the plasma electrode module may be formed in a plate shape or a cylinder shape.

The water treatment apparatus using underwater plasma discharge according to one embodiment of the present disclosure can be used as a mixing and flocculation basin which also serves as a flotation basin which is used for a dissolved air flotation (DAF) method. The mixing and flocculation basin for agglomerating foreign matter present in seawater to form flocs and for flocculating the flocs is equipped with an underwater plasma discharge module according to the present disclosure. Therefore, the water treatment apparatus according to the present disclosure can increase the water treatment efficiency of a dissolved air flotation process.

In addition, the water treatment apparatus using underwater plasma discharge according to one embodiment of the present disclosure can be used as a disinfection basin for removing bacteria contained in raw water. The underwater plasma discharge is used to effectively decompose and remove organic substances and microorganisms that are present in the raw water.

Particularly, the distance between the ground electrode and the plasma electrode module provided in the reactor can be easily adjusted. In addition, due to the use of a three-stage plasma electrode having an integrated structure, plasma can be stably generated. Therefore, water treatment efficiency can be improved.

In addition, the plasma electrode for water treatment according to one embodiment of the present disclosure is an Integrated-type plasma electrode for water treatment. That is, the discharge portion, the fixed portion, and the ground portion are integrated and thus provided as a single module. Therefore, the plasma electrode has good durability and can stably generate plasma. Since the plasma electrode is provided in the form of an electrode module composed of a plurality of electrodes, it is possible to prevent a phenomenon in which excessive electric power is supplied to one electrode to cause the electrode to break or to cause a local flashover.

In addition, with the three-stage structure, with each stage having different lengths and diameters, it is possible to improve grounding efficiency and discharge efficiency and to stably generate plasma, thereby producing a large amount of OH radicals, which results in effective decomposition of organic substances present in raw water.

The effects of the present disclosure are not limited to the effects mentioned above, and other effects which are not mentioned above can be clearly understood by those skilled in the art from the following description.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION OF THE DISCLOSURE

Figure 1:
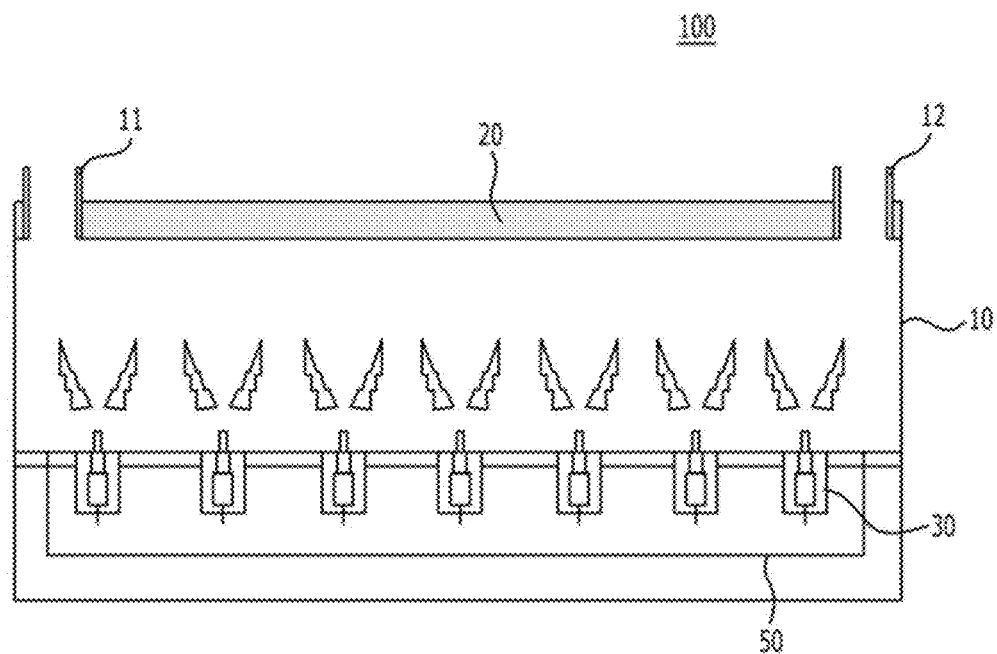
FIG. 1 is a schematic view illustrating a water treatment apparatus according to one embodiment of the present disclosure.

Hereinafter, exemplary embodiments of the present disclosure will be described with reference to the accompanying drawings. These embodiments are presented to describe particularly technical spirit of the present disclosure only for illustrative purposes, and those skilled in the art will appreciate that the scope of the present disclosure is not limited to these embodiments.

Unless otherwise defined, all terms including technical and scientific terms used herein have the same meaning as commonly understood by one of the ordinarily skilled in the art to which the present disclosure belongs. It will be further understood that terms used herein should be interpreted as having a meaning that is consistent with their meanings in the context of the description herein and the relevant art, and will not be interpreted in an idealized or overly formal sense unless expressly so defined herein.

Throughout the drawings, elements that are not related to the description of the disclosure are omitted in order to clearly illustrate the claimed system, and like parts are denoted by like reference numerals. It will be further understood that when a component "comprises" or "has" another component, it means that the component may further include another component, not excluding another component unless stated otherwise. In addition, the term "~ unit" described herein means one unit or block that performs a specific function.

It will be understood that, although the terms first, second, etc. may be used herein to describe various steps, the terms are used only for distinguishing one element step from another step, and the essence, sequence, or order of the steps are not limited by the terms. Therefore, unless explicitly stated for the order of each step, the steps may be performed in a different order from the order in which the steps are described or termed. That is, each of the steps may be performed in the same order as described herein, or substantially simultaneously, or in reverse order.

Figure 2:
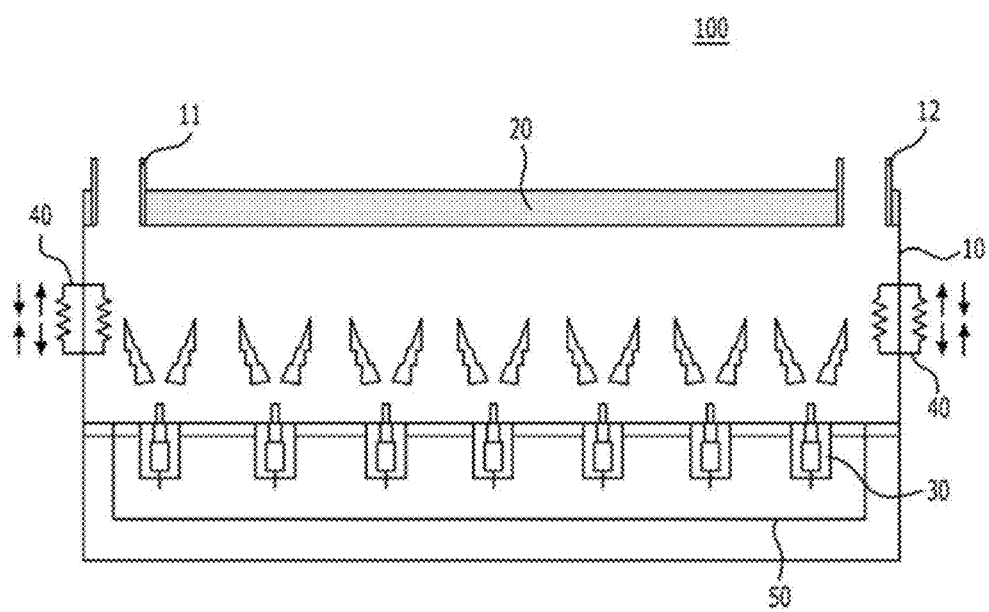
FIG. 2 is a schematic view illustrating a water treatment apparatus according to one embodiment of the present disclosure.

FIGS. 1 and 2 are schematic views illustrating a water treatment apparatus 100 according to one embodiment of the present disclosure. Referring to FIGS. 1 and 2, the water treatment apparatus 100 according to one embodiment of the present disclosure includes a reactor 10, a ground electrode 20, and a plasma electrode 30. The reactor 10 includes an inlet 11 through which raw water (which is water to be treated and hereinafter the to-be-treated water will be simply referred to as raw water) flows into the reactor and an outlet 12 through which purified water flows out. The ground electrode 20 is disposed at a first side of the reactor 10 and the plasma electrode 30 may be disposed at a second side of the reactor 10 and configured to generate plasma. The present disclosure has an advantage of decomposing and removing organic substances and/or microorganisms present in raw water by using underwater plasma discharge which is enabled by being equipped with the plasma electrode 30.

Conventionally, for a pretreatment process of raw water, such as seawater, chlorine is introduced into the raw water to suppress bio-fouling. However, the chlorine added in an excessive amount causes problems, such as corrosion of parts and facilities. The present disclosure substitutes plasma for chlorine, thereby effectively removing organic substances and microorganisms. Therefore, the present disclosure has an advantage of not causing corrosion of parts or facilities while suppressing bio-fouling.

Figure 3:
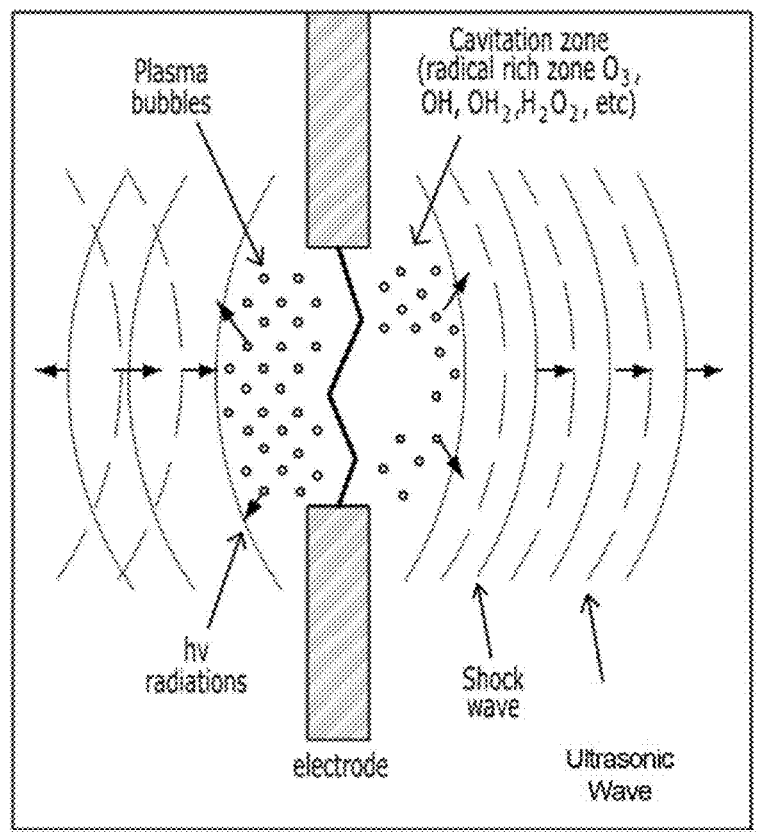
FIG. 3 is a view describing generation principles and effects of plasma.

FIG. 3 is a diagram showing the generation principles and effects of plasma. Before describing the generation principles of plasma, the inspect of underwater discharge plasma on water treatment will be described first.

There are various discharge methods for underwater discharge plasma. For example, a corona discharge, an arc discharge, or the like may be used. The various types of discharge can be performed by varying the arrangement of electrodes or by applying different pulses or voltages to the plasma electrode. The effect of plasma on microorganisms or organic substances in water being treated is cell disruption by a shook wave, an ultrasonic wave, or a high voltage electric field. The cell disruption effect of plasma will be described in more detail below.

First, the cell disruption by a shock wave is based on the principle that a rapid pressure change in liquid causes a shock wave which destroys cells. In this case, the cell disruption depends on the size, shape, and thickness of the cells, and on the intensity of a shock wave.

Second, the cell disruption by an ultrasonic wave is based on the principle that an ultrasonic wave causes cavitation while it propagating through a liquid medium. The cavitation is a phenomenon in which, when an ultrasonic wave generated by an ultrasonic transducer passes through a liquid medium, a vibrating longitudinal wave is produced, which causes a high liquid density zone and a low liquid density zone. When the pressure of the low liquid density zone is lower than the vapor pressure of the liquid, bubbles occur there and then implode when the pressure increases. The implosion of bubbles causes a shock wave which destroys cells. This method is usually used to destroy a small amount of microbial cells.

The cell disruption by a high voltage electric field is analogous to breaking an insulator (corresponding to a cell membrane) by inducing a high potential difference at the cell membrane. Therefore, the survival rate of plankton and bacteria can be drastically reduced by the action of ultraviolet rays, radicals, shock waves, bubbles, etc. generated at the time of plasma discharge.

The water treatment reactor 10 according to one embodiment has an inlet 11 through which raw water flows into the reactor 10 and an outlet 12 through which purified water flows outside. The water treatment reactor 10 may store raw water therein. The shape of the water treatment reactor 10 is not particularly limited to any one form and may be manufactured in various shapes. It may have the same or similar structure as a water treatment reactor used in a conventional wastewater treatment apparatus or a conventional seawater desalination apparatus. Usually, it is manufactured in a rectangular parallelepiped shape.

The ground electrode 20 may be provided on one side of the water treatment reactor 10. The plasma electrode 30 may be provided on the opposite side and used to generate plasma. Although the positions of the inlet 11 and the outlet 12 are not particularly limited, in one embodiment the inlet 11 and the outlet 12 are provided on the same side (in the case of a rectangular parallelepiped shape, provided on the same plane). In one embodiment the ground electrode 20, the inlet 11, and the outlet 12 are provided on the same side and the plasma electrode 30 is arranged to face the ground electrode 20. In this case, the ground electrode 20 having a flat plate shape may serve as the top panel of the reactor 10 (see FIG. 1), and the inlet 11 and the outlet 12 may be formed in the ground electrode 20.

In one embodiment, the water treatment reactor 10 may include a distance adjuster 40 (see FIG. 2) capable of adjusting the distance between the ground electrode 20 and the plasma electrode 30. The voltage applied to the plasma electrode 30 and the distance between the ground electrode 20 and the plasma electrode 30 may be controlled depending on the type or quality of the raw water. The distance adjuster 40 includes components that are arranged on the opposite side surfaces of the reactor 10 to reduce or increase the height of the reactor. In this way, the distance adjuster 40 can adjust the storage capacity of the reactor 10 as well as control the distance between the ground electrode 20 and the plasma electrode 30.

In one embodiment, the ground electrode 20 may be a conventionally used electrode and may foe provided on one side of the reactor 10 as described above. In addition, it may have a flat plate shape, thereby serving as a top cover of the reactor 10. The ground electrode 20 is electrically connected to or is brought into contact with raw water, so that the raw water can be grounded.

In one embodiment, the plasma electrode 30 may be made of tungsten or stainless steel, and may be connected to a power supply (not shown). The power supply unit may apply a pulse, an alternating current (AC) voltage, or a direct current (DC) voltage to the plasma electrode 30. The plasma electrode 30 may be provided at a first side of the reactor 10. Alternatively, a plurality of plasma electrodes 30 may be separately fabricated, but the multiple plasma electrodes 30 are assembled into one plasma electrode module 50. That is, although separately fabricated, the multiple plasma electrodes 30 may be installed in the form of one plasma electrode module 50 in the reactor. In an embodiment, the plasma electrode 30 may be arranged to face the ground electrode 20. A plurality of plasma electrode modules 50 may be installed in the reactor 10 depending on the amount of the raw water to be treated.

Figure 4:
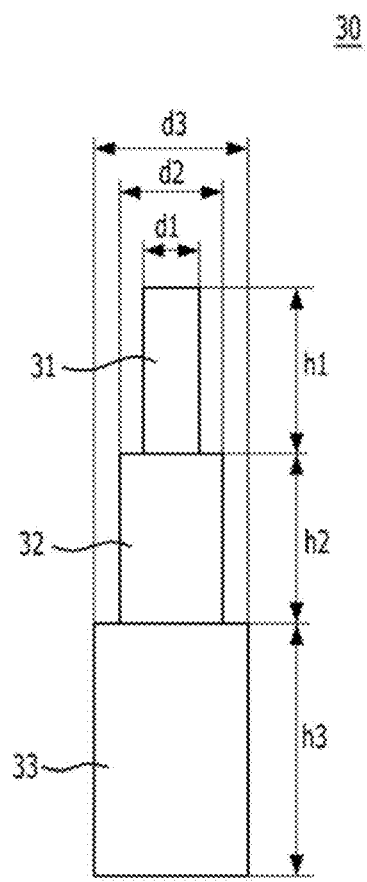
FIG. 4 is a schematic view illustrating a plasma nozzle according to one embodiment of the present disclosure.

FIG. 4 is a schematic view of one exemplary plasma electrode 30 according to one embodiment. The details of the plasma electrode 30 will be described with reference to FIG. 4. The plasma electrode 30 includes a discharge portion 31, a fixed portion 32, and a ground portion 33, and those portions are integrated to be a single body. The integrated structure of the plasma electrode has an advantage of reducing the possibility that excessive electric power is concentrated on one arbitrary-stage electrode, causing the electrode to break. Therefore, the durability of the plasma electrode can be improved, and the plasma electrode 30 can be easily replaced later when it is necessary.

The shape of the electrode of each stage is not particularly limited and may be manufactured in various shapes. However, in one embodiment the electrode has a cylinder shape in terms of stable generation of plasma. Further, the diameter of the discharge portion 31 positioned at the top may be the smallest, and the diameter of the ground portion 33 positioned at the bottom may be the largest (refer to FIG. 4). With such an arrangement in which the diameter decreases toward the top, the insulation efficiency and the discharge efficiency of the plasma electrode 30 may be improved. In order to maximize the insulation efficiency and discharge efficiency of the plasma electrode 30, the ratio of the diameters d1, d2, and d3 of the discharge portion 31, the fixed portion 32, and the ground portion 33, respectively, is set to 1:4 to 6:7 to 8, or set to 1 to 2:8 to 10:12 to 16. On the other hand, the ratio of the heights h1, h2, and h3 of the discharge portion 31, the fixed portion 32, and the ground portion 33, respectively, may be set to 1:1:1 to 2.

A plurality of plasma electrodes may be installed individually in the water treatment reactor. However, a plurality of electrodes is assembled into one plasma electrode module, and the plasma electrodes may be installed in the form of an electrode module in the reactor.

Figure 5A:
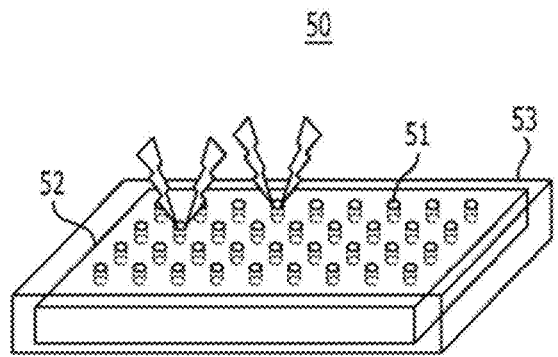
FIG. 5A is a schematic view illustrating a plasma electrode module having a plate shape according to one embodiment of the present disclosure.
Figure 5B:
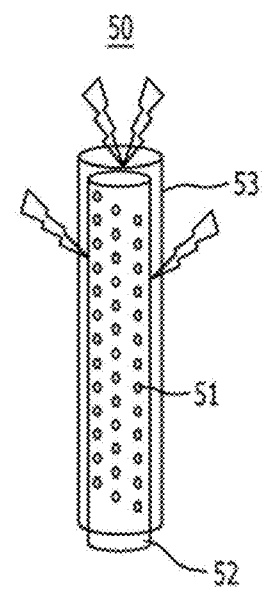
FIG. 5B is a schematic view illustrating a plasma electrode module having a pipe shape according to one embodiment of the present disclosure.

In one embodiment of the disclosure, the plasma electrode module 50 has a plate shape as illustrated in FIG. 5A or a pipe (or tube) shape as illustrated in FIG. 5B. The plasma electrode module 50 includes a conductive base 52 having a plurality of holes 51, and a ceramic layer 53 surrounding the outer circumferential surface of the tungsten base except for the holes 51.

The plasma electrode having a layered structure in which the ground portion 33, the fixed portion 32, and the discharge portion 31 are sequentially stacked is disposed in the hole. The ground portion 33 is in contact with the conductive base, and plasma is generated around the discharge portion 31.

According to the shape of the conductive base, a plate type plasma electrode module or a tube type plasma electrode module can be implemented. These may be selectively used depending on the type of the water treatment reactor.

The conductive base may be made of tungsten having high conductivity and good durability or a tungsten alloy, such as a tungsten nitride. The plasma electrode included in the plasma electrode module in an embodiment has an integrated structure in which the ground portion 33, the fixed portion 32, and the discharge portion 31 are made of the same material having corrosion resistance. In one embodiment, for the material having corrosion resistance and being suitable for manufacturing of an integrated structure, a stainless steel (SUS) material may be used.

The ratio of the diameters d1, d2, and d3 of the discharge portion 31, the fixed portion 32 and the ground portion 33, respectively, of the plasma electrode is, in an embodiment, set to 1:4 to 6:7 to 8, or set to 1 to 2:8 to 10:12 to 16. In addition, the ratio of the heights of the ground portion 33, the fixed portion 32, and the discharge portion 31 may be set to 1 to 2:1:1.

The conductive base may have a plate shape or a pipe, tube, or cylinder shape, and may be made of tungsten, in an embodiment.

Next, a water treatment system including a water treatment apparatus using underwater plasma discharge will be described below. For convenience of description, the water treatment apparatus 100 will be described as an example of the water treatment apparatus used included in the water treatment system, and thus a redundant description will be omitted. However, the present disclosure is not limited thereto.

Figure 6:
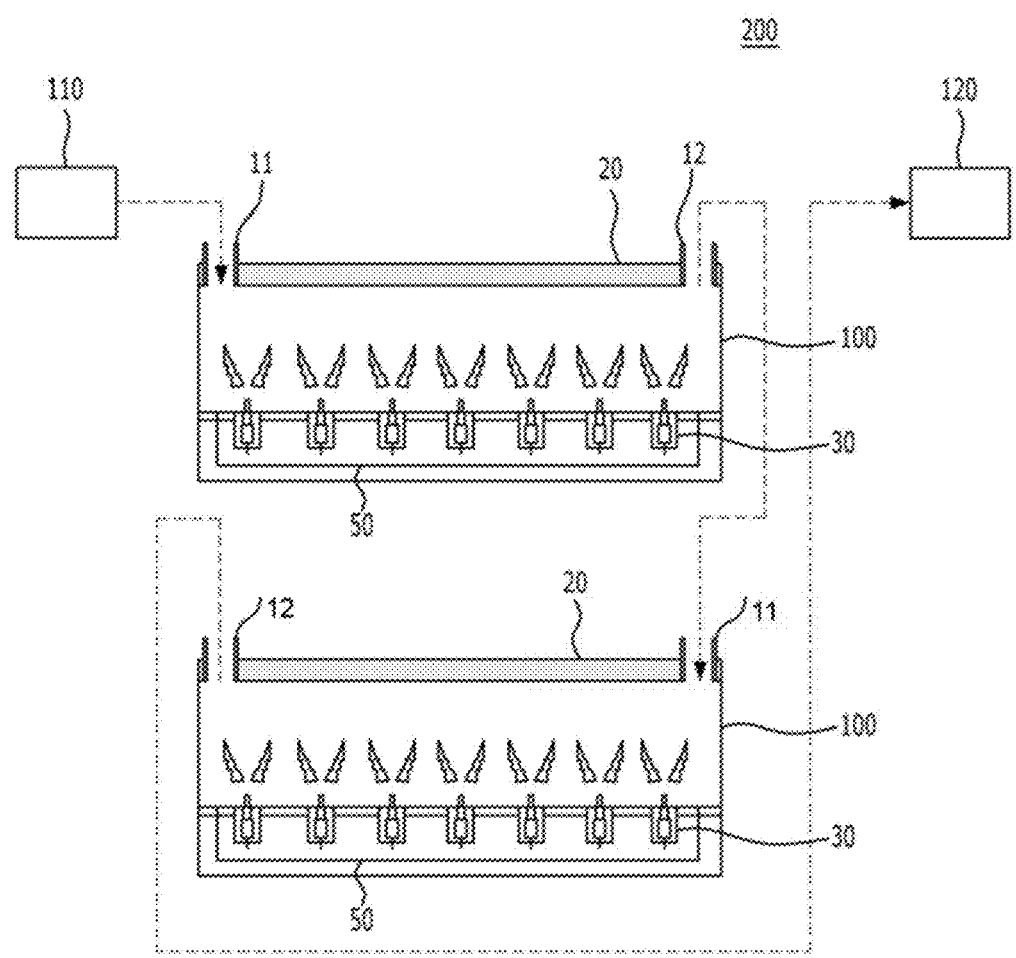
FIG. 6 is a schematic view illustrating a water treatment system in which multiple water treatment apparatuses according to one embodiment of the present disclosure are connected in series.

FIG. 6 shows a water treatment system 200 in which water treatment apparatuses are connected in series. Referring to FIG. 6, the water treatment system 200 according to one embodiment of the present disclosure includes a raw water supply unit 110 for supplying raw water (also called water to be treated), a plurality of water treatment apparatuses 100 connected in series, and optionally a subsequent process tank 120 or a water storage tank.

Each of the water treatment apparatuses 100 includes a reactor 10 having an inlet 11 through which raw water flows into the reactor and an outlet 12 through which purified water is discharged; a ground electrode 20 provided at a first side of the reactor 10; and a plasma electrode 30 provided at a second side of the reactor 10 and configured to generate plasma. Here, the plasma electrode 30 may not be a single electrode but be an array of electrodes because a general water treatment apparatus includes a plurality of plasma electrodes 30. The multiple plasma electrodes 30 may be assembled into one plasma electrode module 50, and the plasma electrode module 50 may be disposed in the reactor 10.

Figure 7:
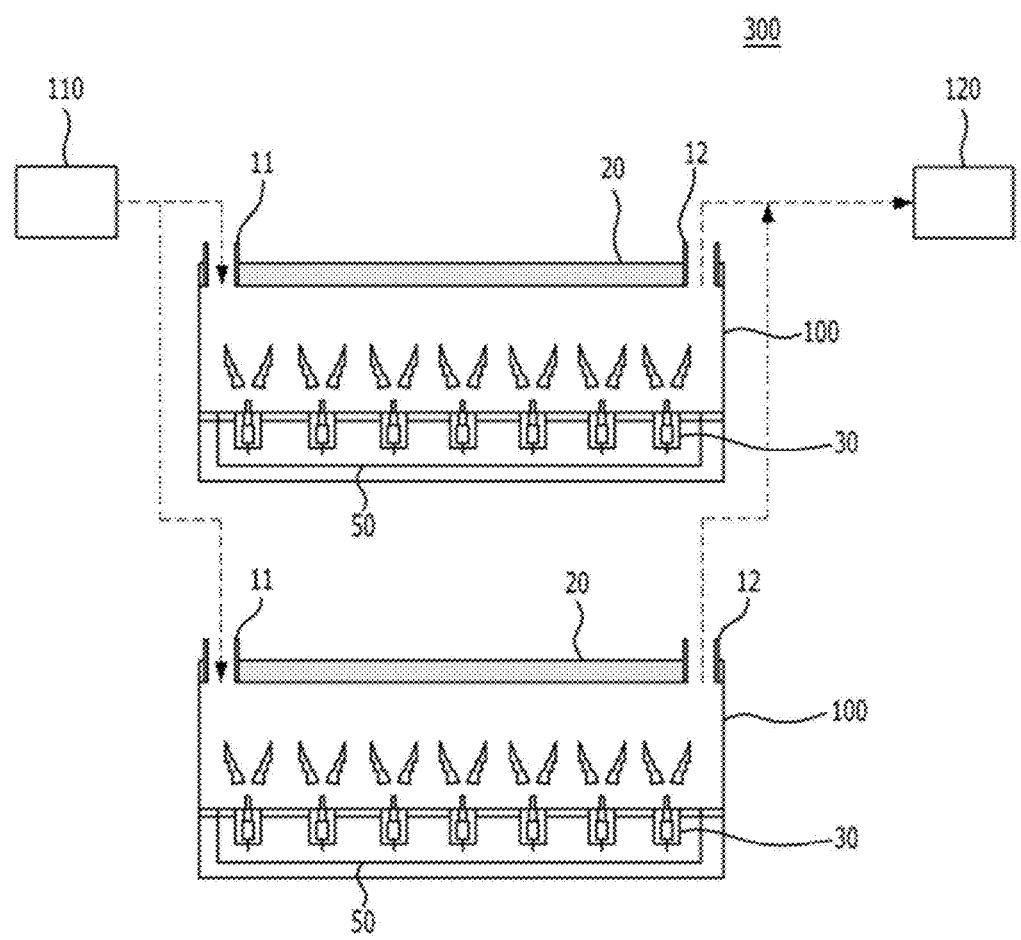
FIG. 7 is a schematic view illustrating a water treatment system in which multiple water treatment apparatuses according to one embodiment of the present disclosure are connected in parallel.

The water treatment apparatus 100 described above with reference to FIG. 1 or FIG. 2 may be used as a water treatment apparatus included in a water treatment system. In the case where a plurality of the water treatment apparatuses 100 is connected in series, raw water supplied from the raw water supply unit 110 may pass through the water treatment apparatuses 100 sequentially, thereby being purified. A water treatment system 200 in which a plurality of water treatment apparatuses 100 is connected in series is more suitable for purification of severely polluted water. That is, when raw water contains a large amount of organic substances and microorganisms and is highly likely to experience biofouling in a subsequent treatment process, since the raw water undergoes multiple times of underwater plasma discharge in the water treatment system 200, the organic substances and microorganisms in the water can be sufficiently eliminated, producing purified water. FIG. 7 shows a water treatment system 300 in which a plurality of water treatment apparatuses 100 according to one embodiment of the present disclosure is connected in parallel. Referring to FIG. 7, the water treatment system 200 according to one embodiment of the present disclosure includes a raw water supply unit 110 supplying raw water, a plurality of water treatment apparatuses 100 connected in parallel, and optionally a subsequent process tank 120 or a water storage tank. Each of the water treatment apparatuses 100 includes a reactor 10 having an inlet 11 through which raw water flows into the reactor and an outlet 12 through which purified water flows out of the reactor, a ground electrode 20 provided at a first side of the reactor 10, and plasma electrode 30 provided at a second side of the reactor 10 and configured to generate plasma. Here, as the plasma electrode 30, the water treatment apparatus in an embodiment includes a plurality of plasma electrodes 30. The multiple plasma electrodes 30 may be assembled into a plasma electrode module 50, and the plasma electrode module 50 may be installed in the reactor 10.

The water treatment apparatus 100 described above with reference to FIG. 1 or FIG. 2 may be used as a water treatment apparatus included in a water treatment system. In this case, raw water supplied from the raw water supply unit 110 is distributed to the multiple water treatment apparatuses 100 connected in parallel so that a plurality of partial flows of raw water simultaneously passes through the multiple water treatment apparatuses 100, so that a large amount of raw water can be purified per unit time. The water treatment system 300 composed of multiple water treatment apparatuses 100 connected in parallel is suitable for purification of a large amount of raw water which is less polluted.

Figure 8:
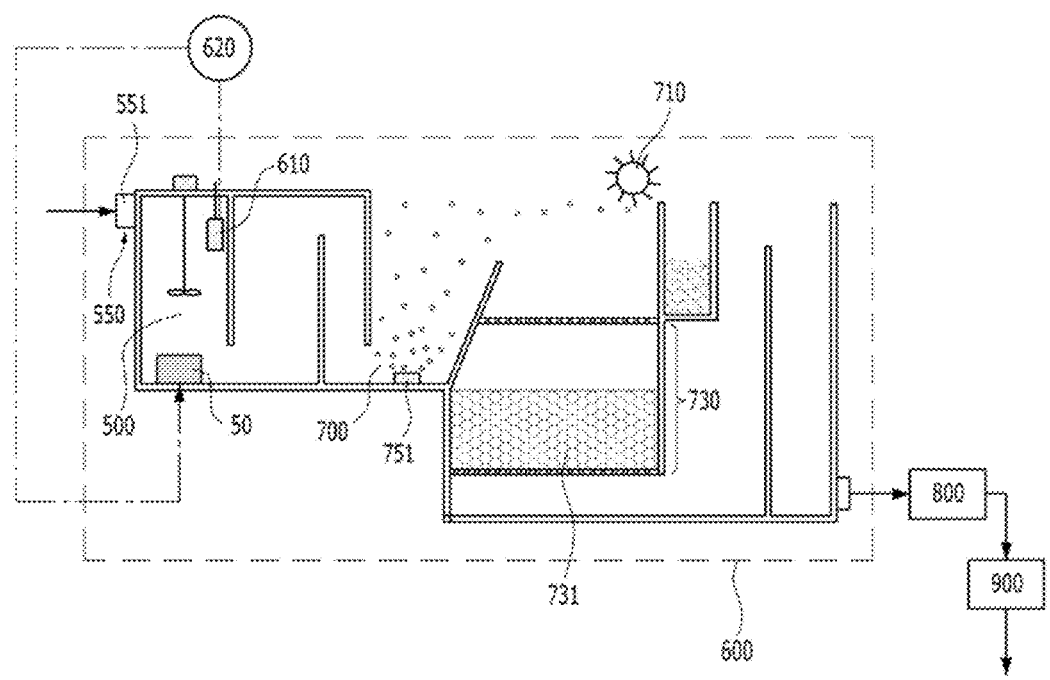
FIG. 8 is a schematic view illustrating an application example in which the water treatment apparatus according to one embodiment of the present disclosure is included in a seawater desalination system and, specifically, applied to a mixing basin of a dissolved air flotation process.

FIG. 8 is a schematic view illustrating a seawater desalination apparatus which is a water treatment apparatus using underwater plasma discharge according to another embodiment of the present disclosure. As illustrated in FIG. 8, the wafer treatment apparatus using the underwater plasma discharge according to one embodiment of the present disclosure can be applied in a seawater desalination process.

A seawater desalination facility includes: a floating filtration apparatus 600 which is a seawater pretreatment apparatus for pretreatment of seawater and a membrane separation apparatus 800 and 500 for purifying raw water that is pretreated by the floating filtration apparatus 600.

The membrane separation apparatus includes: a microfilter membrane module or an ultrafilter membrane module 800 which is generally used for desalination of seawater; and a reverse osmosis membrane module 900, in which the membrane module 800 and the reverse osmosis module 900 are connected in series.

The floating filtration apparatus 600 that is a water treatment apparatus using underwater plasma discharge according to another embodiment of the present disclosure will be described in more detail. The floating filtration apparatus 600 includes: a mixing and flocculation basin 500 for forming and growing flocs by flocculating foreign matter present in seawater; and a flotation and removal basin 700 for floating the flocs presented in treated water discharged from the mixing and flocculation basin 500 by using fine bubbles. The flotation and removal basin 700 includes an air injector 751 for injecting bubbles to cause the flocs to float to the surface of the treated water; a removal unit 710 for removing the flocs floated by the air injector 751; and a filtration unit 730 provided in a lower portion of the flotation and removal basin 700 to remove residual foreign matter in the treated water after suspended substances are removed by the removal unit 710.

The mixing and flocculation basin 500 and the flotation and removal basin 700 are disposed adjacent to each other with partition walls disposed therebetween, and the mixing and flocculation basin 500 and the flotation and removal basin 700 communicate with each other through an upper portion and a lower portion of the partition walls. While the raw water passes through the partition walls, the foreign matter contained in the raw water may be removed.

The plasma electrode module 50 according to the present disclosure is disposed at a lower end of the mixing and flocculation basin 500. Optionally, an inflow chamber 550 is filled with a mixing triggering member 551, which causes resistance to the flow of passing water, and collision, vortex, and turbulence of the flow of passing water. This causes frequent changes of the flow path of the raw water so that the fine particles contained in the raw water come into contact with each other due to turbulence to form flocs and the flocs grow to a predetermined size, without requiring external power.

That is, since the inflow chamber through which seawater (raw seawater) to be fed to a pretreatment stage passes is filled with the mixing triggering member 551, when untreated seawater (raw seawater) passes through the mixing triggering member 551, micro-particles or organic substances in seawater come into contact, with each other due to the vortex or turbulence formed when the seawater passes through the mixing triggering member 551, thereby forming a floc.

The mixing triggering member 551 may be a mesh type material or an aggregation of fiber bundles. In an embodiment, the mesh type material is a multilayered structure or the fiber bundles are intertwined with each other.

In an embodiment, the mesh type material is asymmetrically stacked in multiple layers such that the holes in a lower layer and the holes in an upper layer are misaligned such that straight passages extending in the vertical direction through the multilayered structure may not be formed. In the a symmetrically multilayered mesh type material, since the holes in an upper layer and the holes in a lower layer do not overlap each other, vortices and/or turbulence may occur while raw water flows down by gravity through the mesh type material. Such an asymmetric arrangement has another advantage of increasing a flow passage length and a flow retention time, which results in an increase in contact time and contact area between the raw water and the coagulant also correspondingly increase. As a result, the amount of the flocs increases. The flocs are then floated and removed in the next-stage basin (i.e., the flotation and removal basin) 700. Therefore, the removal efficiency of the foreign substances contained in the raw water can be remarkably increased.

Further, the intensity of the turbulent flow and/or vortex can be controlled by varying the size of the holes of the mesh type material, the flow rate can be appropriately controlled according to the state of the raw water fed into the dissolved air floatation water treatment apparatus of the present disclosure. For example, when the content of foreign matter in the raw water is low, the size of the mesh hole is increased and the number of the mesh materials to be stacked is reduced, so that the contact area and time between the coagulant and the raw water are reduced. On the contrary, when the content of the foreign matter in the raw water is high, the contact area and time between the coagulant and the raw water are increased to appropriately adjust the amount and size of the generated flocs.

The flocs in the raw water, which are formed due to the turbulence and/or vortex while the raw water passes through the mixing triggering member 551, are grown by a stirrer, which is a mechanical mixing apparatus.

The flotation basin 700 for floating and removing the flocs by injecting fine bubbles to the treated water that has passed through the mixing and flocculation basin 500 includes: an air injector 751 for floating the flocs contained in the treated water; a removal unit 710 for removing the flocs floated by the air injector 751; and a filtration unit 730 for filtering out residual foreign matter contained in the treated water resulting from the floc removal process.

More specifically, in a compartment disposed at the front end of the removal unit, fine bubbles, provided by the air injector 751, adhere to the flocs and rise together to the surface of water where the flocs are removed and discharged outside by a skimmer.

Conventionally, a chemical coagulant has been used in the mixing and flocculation basin 500 to facilitate the formation of the flocs, but this chemical coagulant must be removed during the subsequent membrane separation process, which causes an additional processing cost.

In the present disclosure, the plasma electrode module 50 is provided on the lower surface of the mixing and flocculation basin 500 without injecting any chemical coagulant. That is, plasma is generated through underwater discharge by using the plasma electrode 30 included in the plasma electrode module 50 so that organic substances and microorganisms present in seawater (raw water) can be decomposed or removed by using the plasma. The decomposed or removed organic substances or microorganisms may act as agglomeration nuclei in the mixing and flocculation basin 500, so that addition of an additional chemical coagulant may not be required.

Conventionally, chlorine is injected into raw water before pretreatment of the raw water, such as seawater, to suppress bio-fouling caused by organic substances, but problems such as corrosion frequently occur due to excessive injection of chlorine. However, the present disclosure has the advantage of eliminating organic substances and microorganisms by not using the chlorine injection method but by using a plasma treatment method, thereby preventing corrosion and bio-fouling simultaneously.

Next, a seawater desalination method using underwater plasma discharge, which is another embodiment of the present disclosure, as a pretreatment process will be described.

As described above, the seawater desalination method according to the present disclosure can be divided into a seawater pretreatment process and a seawater desalination process using a membrane separation module. More specifically, the seawater desalination method can be divided into a pretreatment process of preliminarily treating seawater using a floating filtration apparatus 700 and a desalination process of treating the effluent of the floating filtration apparatus 700 by using a membrane separation module.

The seawater pretreatment may include: forming a plasma by using the plasma electrode module 50 located below the mixing and flocculation basin 500 constituting the floating filtration apparatus 700; forming and growing flocs by agglomerating foreign matter present in the seawater in the mixing and flocculation basin 500 of the floating filtration apparatus; and floating and removing the flocs contained in the treated water that has passed through the mixing and flocculation basin 500 by using fine bubbles.

In one embodiment the step of forming the plasma by using the plasma electrode module 50 includes measuring the concentration of the suspended solids or organic substances contained in the seawater flowing into the mixing and flocculation basin 500 and controlling the operation of the plasma electrode module 50 in accordance with the measurement result. When the concentration of impurities in the seawater is low enough to be sufficiently agglomerated and removed by only the mixing triggering member 551 installed in a seawater inflow path as described above, the plasma electrode module may not be operated. On the other hand, when the water quality of the seawater is not good, for example, in the case where a BOD (Biochemical Oxygen Demand), COD (Chemical Oxygen Demand) or SS (Suspended Solid) value is equal to or exceeds a predetermined level, it is necessary to operate the plasma electrode module. That is, when additional coagulation and flocculation are required, the activation of the plasma electrode module, the plasma intensity, the operation time of the plasma electrode, and the like may be controlled by means of a controller.

Since the details of the plasma electrode module have already been described above, a description of the plasma electrode module will be omitted here. It is noted that the plasma electrode used to generate a plasma may be made of a corrosion resistive material, such as stainless steel, because it is subject to sea water treatment. In addition, the plasma electrode in an embodiment has an integrated structure.

[Embodiment]

In order to determine discharge characteristics according to the diameter of a discharge portion of a plasma electrode for water treatment, the concentration of ozone ($O_3$) was measured by generating a plasma using a plasma electrode having an integrated structure in which a ground portion, a fixed portion, and a discharge portion all have a cylinder shape.

The lengths of the ground, fixed, and discharge portions were fixedly set to 16 mm, 11 mm, and 11 mm, respectively, and the concentration of ozone generated by applying a current was measured while varying the diameter of the discharge portion. Ozone is generated due to the plasma generated around the discharging portion, which is an end portion of the plasma electrode. Such ozone has an important influence on the decomposition of contaminants, such as TOC (Total Organic Carbon), in the plasma water treatment process.

The diameter of the discharge portion was changed within a range of 1 to 4 mm. At this time, the ratio of the diameters of the ground portion 33, the fixed portion 32 and the discharge portion 31 was fixedly set to 7.5:5:1, and the same voltage is applied. The measurement results of the ozone concentration are summarized in Table 1 below.

TABLE 1

|  | Diameter of discharge portion [mm] | | | |
| --- | --- | --- | --- | --- |
|  | 1 | 2 | 3 | 4 |
| $O_3$ concentration [ppm] | — | 0.06 | 0.07 | 0.0001 |

As can be seen from the measurement results in Table 1, when the diameter of the discharge portion was excessively small, plasma was not properly generated, resulting in production of an insignificant amount of ozone. When the diameter was excessively large, it was confirmed that plasma generation was not uniform over the entire surface area of the discharge portion, which lowers the overall ozone generation rate.

The description hereinabove presents only some exemplary embodiments of various embodiments of the present disclosure. Therefore, it can be understood that the present disclosure is not limited to the above embodiments and various changes and modifications may be made by those skilled in the art without departing from the scope of the present disclosure.

In addition, the present disclosure is not limited to the above-described specific embodiments and description, and various modifications and changes are possible without departing from the scope of the present disclosure as defined in the claims. Such variations will fall within the scope of protection of the present disclosure.

The invention claimed is:

1. A water treatment apparatus using underwater plasma discharge, the apparatus comprising:
   a reactor having an inlet through which raw water flows into the reactor and an outlet through which purified water flows out;
   a ground electrode provided at a first side of the reactor;
   a plasma electrode module provided at a second side of the reactor and configured to generate plasma; and
   wherein the plasma electrode module comprises:
      a tungsten base provided with a plurality of holes; a ceramic layer covering an outer circumferential surface of the tungsten base except for the holes; and a plasma electrode having a layered structure in which a ground portion, a fixed portion, and a discharge portion have a cylinder shape and are sequentially stacked on each other, the plasma electrode being disposed in the hole,
      wherein the ground portion is in contact with the tungsten base, and
      wherein the discharge portion generates the plasma.

2. The water treatment apparatus according to claim 1, wherein the reactor further comprises a distance adjuster configured to adjust a distance between the ground electrode and the plasma electrode module.

3. The water treatment apparatus according to claim 1, wherein the ground electrode has a plate shape.

4. The water treatment apparatus according to claim 1, wherein in the reactor, the ground electrode and the plasma electrode module are arranged to face each other.

5. The water treatment apparatus according to claim 4, wherein the ground portion, the fixed portion, and the discharge portion are made of the same material and are formed as an integrated structure.

6. The water treatment apparatus according to claim 5, wherein the integrated structure is made of stainless steel having corrosion resistance.

7. The water treatment apparatus according to claim 4, wherein the ground portion, the fixed portion, and the discharge portion have a diameter ratio of 7 to 8:4 to 6:1.

8. The water treatment apparatus according to claim 4, wherein the ground portion, the fixed portion, and the discharge portion have a height ratio of 1 to 2:1:1.

9. The water treatment apparatus according to claim 4, wherein the tungsten base has a plate shape or a cylinder shape.

10. A water treatment system using underwater plasma discharge, the system comprising:
    a raw water supply unit configured to supply raw water; and
    a plurality of water treatment apparatuses connected in series or in parallel,
    wherein each of the water treatment apparatus comprises:
       a reactor having an inlet through which raw water flows into the reactor and an outlet through which purified water flows out; a ground electrode provided at a first side of the reactor; and a plasma electrode module provided at a second side of the reactor and configured to generate plasma;
       wherein the plasma electrode module comprises: a tungsten base provided with a plurality of holes; a ceramic layer surrounding an outer circumferential surface of the tungsten base except for the holes; and a plasma electrode having a layered structure in which a ground portion, a fixed portion, and a discharge portion have a cylinder shape and are sequentially stacked on each other, the plasma electrode being disposed in the hole,
       wherein the ground portion is in contact with the tungsten base, and
       wherein the plasma is generated by the discharge portion.

11. The water treatment system according to claim 10, wherein the reactor further comprises a distance adjuster configured to adjust a distance between the ground electrode and the plasma electrode module.

12. The water treatment system according to claim 10, wherein the ground electrode has a plate shape, and the ground electrode and the plasma electrode module are arranged to face each other in the reactor.

13. The water treatment system according to claim 10, wherein the ground portion, the fixed portion, and the discharge portion are made of the same material and are formed as an integrated structure.

14. The water treatment system according to claim 13, wherein the integrated structure is made of stainless steel having corrosion resistance.

15. The water treatment system according to claim 10, wherein the ground portion, the fixed portion, and the discharge portion have a diameter ratio of 7 to 8:4 to 6:1.

16. The water treatment system according to claim 10, wherein the ground portion, the fixed portion, and the discharge portion have a height ratio of 1 to 2:1:1.

17. The water treatment system according to claim 10, wherein the tungsten base has a plate shape or a cylinder shape.

18. The water treatment system according to claim 10, wherein the reactor serves as a mixing and flocculation basin for coagulating foreign matter to form flocs and aggregating the flocs or serves as a disinfection basin for removing bacteria.

* * * * *